(12) United States Patent
Theogaraj

(10) Patent No.: US 10,212,079 B2
(45) Date of Patent: Feb. 19, 2019

(54) ROUTER ADVERTISEMENT CACHING

(71) Applicant: ARUBA NETWORKS, INC., Sunnyvale, CA (US)

(72) Inventor: Isaac Theogaraj, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 110 days.

(21) Appl. No.: 15/421,747

(22) Filed: Feb. 1, 2017

(65) Prior Publication Data

US 2018/0123956 A1  May 3, 2018

(51) Int. Cl.
| H04L 12/747 | (2013.01) |
| H04L 12/713 | (2013.01) |
| H04L 12/773 | (2013.01) |
| H04L 29/12 | (2006.01) |
| H04L 12/46 | (2006.01) |
| H04W 40/24 | (2009.01) |
| H04L 12/751 | (2013.01) |
| H04L 12/707 | (2013.01) |
| H04L 12/721 | (2013.01) |
| H04L 29/14 | (2006.01) |

(52) U.S. Cl.
CPC ........ *H04L 45/742* (2013.01); *H04L 12/4641* (2013.01); *H04L 45/02* (2013.01); *H04L 45/22* (2013.01); *H04L 45/26* (2013.01); *H04L 45/586* (2013.01); *H04L 45/60* (2013.01); *H04L 61/6059* (2013.01); *H04L 69/40* (2013.01); *H04W 40/24* (2013.01)

(58) Field of Classification Search
CPC ....... H04L 45/747; H04L 45/26; H04L 45/22; H04L 45/02; H04L 45/586
See application file for complete search history.

(56) References Cited

U.S. PATENT DOCUMENTS

| 2008/0317049 | A1 | 12/2008 | Sinicrope et al. |
| 2010/0046524 | A1* | 2/2010 | Rune ................... H04L 12/4633 370/395.53 |
| 2011/0103284 | A1* | 5/2011 | Gundavelli ............. H04L 12/18 370/312 |
| 2017/0085629 | A1* | 3/2017 | Mahapatra .......... H04L 67/1002 |
| 2017/0244592 | A1* | 8/2017 | Mahapatra .......... H04L 41/0659 |

FOREIGN PATENT DOCUMENTS

| EP | 1294137 | 3/2003 |
| EP | 2497232 B1 | 9/2012 |

* cited by examiner

Primary Examiner — Bo Hui A Zhu
(74) Attorney, Agent, or Firm — Hewlett Packard Enterprise Patent Department

(57) ABSTRACT

Example implementations relate to router advertisement caching. A controller may comprise a processing resource and a memory resource storing machine-readable instructions to cause the processing resource to perform a number of actions. For instance, the controller may cache a router advertisement (RA) from a router, select, in response to a client device associating with the controller, the cached RA from the router, and unicast the RA from the router to the client device.

20 Claims, 4 Drawing Sheets

ROUTER ADVERTISEMENT CACHING

BACKGROUND

Internet Protocol version 6 (IPv6) networks allow for a client device to auto-discover routers in a network. Auto-discovery of routers may be performed through a router discovery mechanism of the client device. A client device that has auto-discovered a router can then populate the router as a gateway in its routing table so that the client device can communicate on the network through the router.

DETAILED DESCRIPTION

Figure 1:
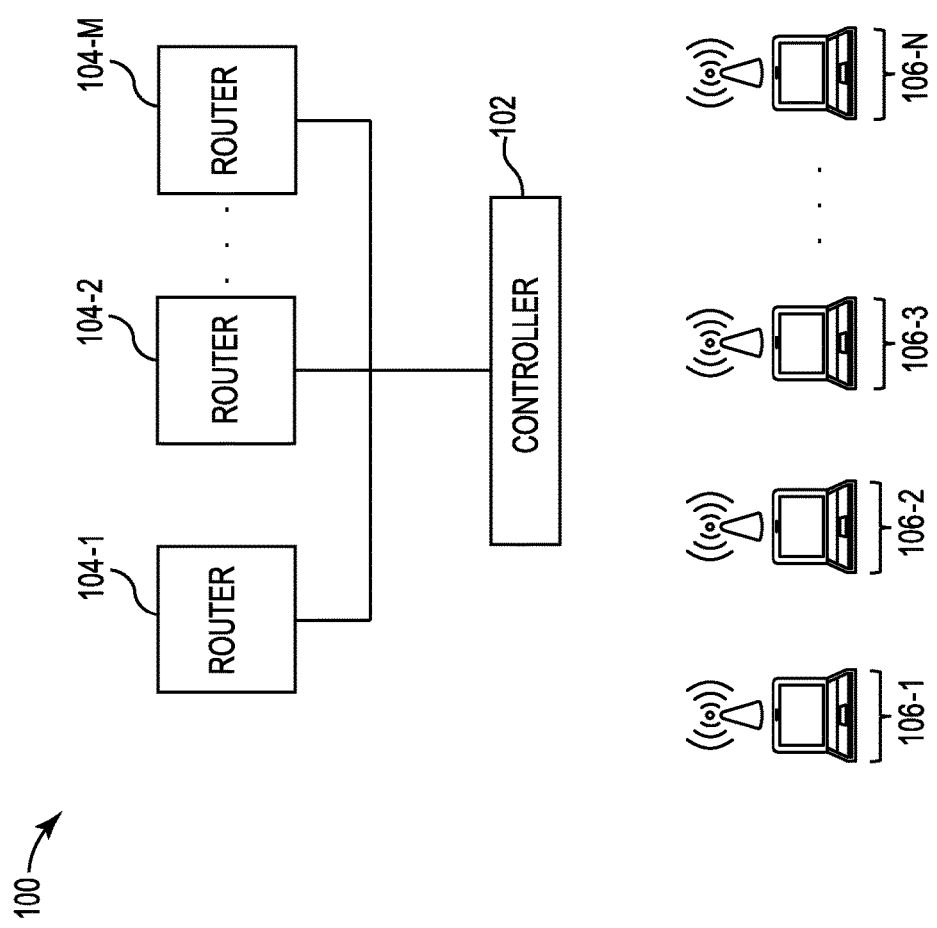
FIG. 1 illustrates an example network layout consistent with the present disclosure.

IPv6 is a communication protocol that provides an identification and location system for computing devices on networks and routes traffic across the Internet. IPv6 networks may include a large quantity of subnets that may support a large number of client devices. As used herein, a subnet refers to a subdivision of a network. An IPv6 network can include a virtual local area network (VLAN) with a single subnet, or more than one VLAN that may host bigger subnet ranges relative to a single subnet. Client devices may communicate through these network architectures.

The IPv6 protocol may allow for the existence of more than one router in the network. For example, an IPv6 network may include two routers. In this example network, a client device may see router advertisements from both routers. As used herein, a router advertisement (RA) refers to a solicitation communication packet that can include various configuration information for a client device to communicate on the network through the router. As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

A client device may receive the RAs from both routers and populate two gateways in its routing table. As used herein, a gateway refers to a network node through which data in a network may be communicated. As used herein, a routing table refers to a data table that lists routes to particular network destinations, such as a gateway (e.g., a router).

However, in some environments, a single router is used by the client device in order to communicate on the network. If the router used by the client device were to fail, it may take a lengthy period of time for the client device to receive another RA from a different router. Once the RA from the different router is received, the client device can remove the gateway from its routing table for the failed router and update the routing table to communicate through the different router. During the time period prior to receiving the RA from the different router, the client device may be unable to communicate on the network.

Router advertisement caching according to the disclosure allows for an RA proxy via a controller. Using this proxy mechanism, a failure of a router can be determined quickly and may allow for a different router to failover in order to provide network access to the client device. As used herein, the term "mechanism" generally refers to a component of a system or device to serve one or more functions, including but not limited to, software components, electronic components, electrical components, mechanical components, electro-mechanical components, etc.

As used herein, failover refers to a method of protecting computing systems from failure, in which other equipment automatically takes over when equipment, such as a router, fails. As a result, network access downtime for client devices as a result of a router failure can be short. Router advertisement caching can also provide load balancing for routers to avoid poor network performance when a large quantity of client devices may be communicating on the network.

FIG. 1 illustrates an example network layout 100 consistent with the present disclosure. As illustrated in FIG. 1, the network layout 100 may include controller 102, routers 104-1, 104-2, 104-M (referred to collectively as routers 104), and client devices 106-1, 106-2, 106-3, 106-N (referred to collectively as client devices 106).

Controller 102 can cache a router advertisement (RA) received from routers 104. As used herein, cache refers to storing data. As used herein, a router refers to a networking device that forwards data packets between networks. For example, routers 104 may generate and multicast RAs to other network devices, such as a controller. As used herein, multicast refers to sending information, such as data packets, to a group of network devices. As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. Controller 102 may receive the RAs from routers 104 and cache them.

Although not shown in FIG. 1 for clarity and so as not to obscure examples of the disclosure, controller 102 may be included in a switch. As used herein, a switch refers to a computer networking device that connects devices together on a network by using, for example, packet switching to receive, process and forward data to a destination device. For example, controller 102 may be included in a link aggregation control protocol (LACP) switch, although examples of the disclosure are not limited to an LACP switch. A switch can include memory, including read-write memory, and a hierarch of persistent memory such as ROM, EPROM, and Flash memory.

Although not shown in FIG. 1 for clarity and so as not to obscure examples of the disclosure, controller 102 may be included in an access point (AP). An AP refers to a networking device that allows a client device to connect to a wired or wireless network. As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards. An AP can include a processing resource such as a processing resource, memory, and input/output interfaces, including wired network interfaces such as IEEE 802.3 Ethernet interfaces, as well as wireless network interfaces such as IEEE 802.11 WiFi interfaces, although examples of the disclosure are not limited to such interfaces. An AP can include memory, including read-write memory, and a hierarch of persistent memory such as ROM, EPROM, and Flash memory.

As used herein, a client device refers to a device including a processing resource, memory, and input/output interfaces for wired and/or wireless communication. A client device may include a laptop computer, a desktop computer, a mobile device, and/or other wireless devices, although examples of the disclosure are not limited to such devices. A mobile device may refer to devices that are (or may be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

Client devices 106 may connect to controller 102 via a network relationship. Examples of such a network relationship can include a local area network (LAN), VLAN, wide area network (WAN), personal area network (PAN), a distributed computing environment (e.g., a cloud computing environment), storage area network (SAN), Metropolitan area network (MAN), a cellular communications network, and/or the Internet, among other types of network relationships.

Routers 104 can be associated with a VLAN. As used herein, a VLAN refers to a broadcast domain (e.g., a subdivision of a network) that is partitioned in a network at a data link layer, where the data link layer is a protocol layer that transfers data between network nodes.

The VLAN associated with routers 104 can operate on an IPv6 protocol. As previously described, IPv6 refers to a communication protocol that provides an identification and location system for computing devices on networks and routes traffic across the Internet.

Controller 102 can select, in response to a client device 106 associating with controller 102, a cached RA received from router 104. For example, a client device, such as client device 106-1, can associate with controller 102. In response, controller 102 can select a cached RA received from router 104-1.

Controller 102 can select the cached RA from router 104 in response to receiving a router solicitation from client device 106. As used herein, a router solicitation refers to a solicitation communication packet that prompts a router for an RA. For example, client devices 106 can send a router solicitation to controller 102, and in response, controller 102 can select a cached RA from routers 104.

Controller 102 can unicast the selected RA from routers 104 to client devices 106 to cause client devices 106 to connect to routers 104. As used herein, unicast refers to sending information, such as data packets, to a single network device. For example, controller 102 can unicast the selected RA from router 104-1 to client device 106-1. In response to client device 106-1 receiving, from controller 102, the RA associated with router 104-1, client device 106-1 can connect to router 104-1.

Causing client devices 106 to connect to routers 104 can include causing client devices 106 to generate an Internet Protocol (IP) address based on prefix information included in the RA associated with routers 104. As used herein, an IP address refers to a numerical label assigned to a client device communicating in a computing network for network interface identification and location addressing. As used herein, prefix information may refer to an amount of bits included in a network. For example, client devices 106 can generate an IP address based on prefix information included in the RA associated with routers 104 that can be utilized to identify and route client devices 106 that are communicating on a network.

Causing client devices 106 to connect to routers 104 can include causing client devices 106 to populate a gateway included in a routing table of client devices 106. As described above, a gateway refers to a network node through which data in a network may be communicated. Further, a routing table refers to a data table that lists routes to particular network destinations, such as a gateway (e.g., a router).

As an example, client device 106-1 may receive an RA associated with router 104-1 from controller 102. Client device 106-1 may populate a routing table with gateway information for router 104-1. Client device 106-1 may then communicate on network layout 100 through the gateway that is router 104-1 using the gateway information for router 104-1. A routing table may be stored in memory of client devices 106.

A different client device 106 may associate with controller 102. In response, controller 102 may select an RA received from a different router 104. For example, client device 106-2 may associate with controller 102. Controller 102 may select an RA from router 104-2.

Controller 102 may then unicast the RA from the different router 104 to the different client device. Continuing with the example above, controller 102 may unicast the RA from router 104-2 to client device 106-2 to cause client device 106-2 to connect to the second router. That is, client device 106-2 may populate a routing table with gateway information for router 104-2, and communicate on network layout 100 through the gateway that is router 104-2 using the gateway information for router 104-2.

Controller 102 may use different selection methods to select an RA received from router 104-1, 104-2, 104-M to unicast to client device 106-1, 106-2, 106-3, 106-N. For example, controller 102 may use a round-robin selection, selection based on router information, and/or selection based on client device information.

Controller 102 may select an RA from routers 104 for client devices 106 using a round-robin selection. For example, in a network environment with two routers, controller 102 can select an RA from router 104-1 in response to client device 106-1 associating with controller 102, and unicast the RA from router 104-1 to client device 106-1. Controller 102 can select an RA from router 104-2 in response to client device 106-2 associating with controller 102, and unicast the RA from router 104-2 to client device 106-2. Controller 102 can then select the RA from router 104-1 in response to client device 106-3 associating with controller 102, and unicast the RA from router 104-1 to client device 106-3. Controller 102 can then select the RA from router 104-2 in response to a client device 106-N associating with controller 102, and unicast the RA from router 104-2 to client device 106-N, and so on. That is, an RA from each router in the network environment is selected as client devices associate with controller 102 until all of the RAs from all of the routers are selected, at which point the round-robin selection process starts over and is repeated.

Although the network environment in the above example is described as including two routers, examples of the disclosure are not so limited. For instance, the network environment may include M routers, where the round robin selection process is performed through the M routers as N client devices associate with controller 102.

Controller 102 may select an RA from routers 104 for client devices 106 based on router information. For example, controller 102 may select an RA based on operating information of the router, as will be further described herein.

Router information may include a plurality (e.g., a quantity) of client devices 106 associated with each router 104. For example, router 104-1 may include four client devices that are connected to router 104-1 and router 104-2 may include two client devices that are connected to router 104-2. Controller 102 may select an RA from router 104-2 as router 104-2 has less client devices connected to it than does router 104-1.

Router information may include response times of each router 104. As used herein, router response time refers to an amount of time taken for data, such as a data packet, to travel from the router, to a destination, and back to the router. For example, router 104-1 may have a slower response time than router 104-2 at the point in time at which client device 106-2 associates with controller 102. In response to the slower response time, controller 102 may select an RA from router 104-2 to unicast to client device 106-2.

Router information may include priority information for each router 104. For example, router 104-1 may have a higher priority ranking than router 104-2 at the point in time at which client device 106-2 associates with controller 102. In response to the higher priority ranking, controller 102 may select an RA from router 104-1 to unicast to client device 106-2.

Router information may include a bandwidth for each router 104. As used herein, bandwidth refers to a bit-rate of available or consumed information capacity. For example, router 104-1 may have a higher bandwidth than router 104-2 at the point in time at which client device 106-2 associates with controller 102. In response to the higher bandwidth, controller 102 may select an RA from router 104-2 to unicast to client device 106-2.

Router information may include a data throughput for each router 104. As used herein, data throughput refers to a rate of transmission of information. For example, router 104-1 may have a higher data throughput than router 104-2 at the point in time at which client device 106-2 associates with controller 102. In response to the higher data throughput, controller 102 may select an RA from router 104-1 to unicast to client device 106-2.

Although router information is described as including plurality (e.g., a quantity) of client devices associated with each router, response times of each router, a priority of each router, bandwidth of each router, and/or data throughput of each router, examples of the disclosure are not so limited. For example, router information may include any other type of router information that may be used to select an RA to unicast to a client device associating with the controller.

Controller 102 may select an RA from routers 104 for client devices 106 based on client device information. For example, controller 102 may select an RA based on operating information of a client device, as will be further described herein.

Client device information may include a client device type of each client device 106. A client device type may include a mobile device, a laptop, a tablet, etc. For example, controller 102 may select an RA from router 104-1 based on client device 106-1 being a mobile device, and may select an RA from router 104-2 based on client device 106-2 being a tablet.

Client device information may include a role associated with each client device 106. A client device type role may include a role of a user of a client device and/or permission levels of a client device. In some examples, controller 102 may select an RA from router 104-1 based on client device 106-1 being a mobile device associated with an employee who is an executive, and may select an RA from router 104-2 based on client device 106-2 being associated with a lower level employee. In some examples, controller 102 may select an RA from router 104-1 based on client device 106-1 having administrative permission levels within the VLAN, and may select an RA from router 104-2 based on client device 106-2 having restricted access levels within the VLAN.

Client device information may include a time of day. For example, controller 102 may select an RA from router 104-1 based on client device 106-1 associating with controller 102 in the morning, and may select an RA from router 104-2 based on client device 106-2 associating with controller 102 in the afternoon.

Client device information may include a client device association history of each client device 106. Client device association history may include a number of associations with controller 102, a duration of associations with controller 102, etc. For example, controller 102 may select an RA from router 104-1 based on client device 106-1 having a higher number of associations with controller 102 than client device 106-2, and may select an RA from router 104-2 based on client device 106-2 having a lower number of associations with controller 102 than client device 106-1.

Client device information may include a client device activity history of each client device 106. Client device activity history may include history of downloads by a client device, sizes of downloads, amount and/or duration of voice and/or video traffic, etc. For example, controller 102 may select an RA from router 104-1 based on client device 106-1 having a high number of downloads, and may select an RA from router 104-2 based on client device 106-2 having a lower number of downloads than client device 106-1.

Controller 102 can send router solicitations to routers 104. For example, controller 102 can send periodic router solicitations to routers 104 to prompt routers 104 to send RAs. The router solicitations from controller 102 can be useful in performing a health check on routers 104. For instance, periodic router solicitations from controller 102 to routers 104 can be used to determine whether routers 104 are functioning properly.

Controller 102 can send periodic router solicitations to routers 104 at a predetermined frequency. For example, controller 102 can send router solicitations to routers 104 every second, although examples of the disclosure are not so limited. For instance, controller 102 can send router solicitations to routers 104 at a frequency faster than one second (e.g., every half second) or slower than one second (e.g., every two seconds). The predetermined frequency may be modifiable. For example, controller 102 can send more router solicitations to routers 104 based on time of day, router bandwidth, data throughput of each router, response times of each router, etc.

Controller 102 can unicast a zero lifetime RA to client devices 106 in response to a router 104 failing to respond to a router solicitation from controller 102 in a predetermined threshold time. As used herein, a zero lifetime RA refers to a RA that indicates to a client device the lifetime of the gateway populated in the client device's routing table is zero. The zero lifetime RA causes client devices 106 to remove the gateway for the failed router from its routing table.

In an example, controller 102 can send a router solicitation to router 104-1, where client device 106-1 is connected to router 104-1. Router 104-1 may fail to send an RA to controller 102 in response to the router solicitation from controller 102 in the predetermined threshold time because router 104-1 has failed. In response, controller 102 can send a zero lifetime RA to client device 106-1 to cause client device 106-1 to remove the gateway for router 104-1 from its routing table, causing client device 106-1 to disconnect from router 104-1.

Controller 102 can unicast, to client devices 106, a different RA associated with a different router of routers 104. The different RA can cause the client devices 106 to connect to a different router associated with the different RA. Continuing with the example above, controller 102 can unicast, to client device 106-1, an RA from router 104-2, causing client device to populate the gateway for router 104-2 in its routing table. In effect, controller 102 causes router 104-2 to failover for router 104-1 in order to minimize an amount of network connectivity downtime experienced by client device 106-1 in the event of the failure of router 104-1.

Router advertisement caching can be used to provide load balancing and redundancy for client devices in a network environment. Selecting previously cached RAs as client devices associate with a controller of the network can provide load balancing across routers in the network, ensuring performance in situations where a large number of client devices may be connected to the network. Further, router solicitations sent to the routers by the controller to perform router health checks can provide a fast failover in the event of a router failure, ensuring consistent network connectivity and minimal network outages for client devices.

Figure 2:
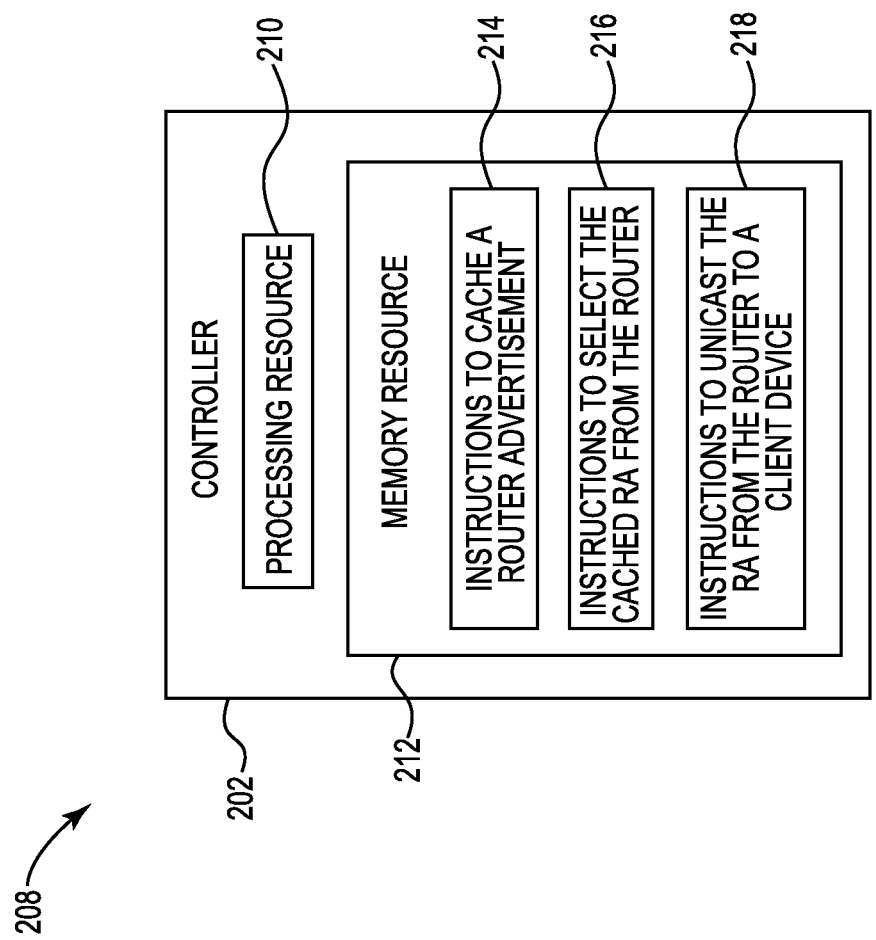
FIG. 2 is a block diagram of an example controller for outer advertisement caching, consistent with the present disclosure.

FIG. 2 is a block diagram 208 of an example controller 202 for router advertisement caching, consistent with the present disclosure. As described herein, the controller 202 may perform a number of functions related to router advertisement caching. Although not illustrated in FIG. 2, the controller 202 may include a processing resource and a machine-readable storage medium. Although the following descriptions refer to a single processing resource and a single machine-readable storage medium, the descriptions may also apply to a system with multiple processing resources and multiple machine-readable storage mediums. In such examples, the controller 202 may be distributed across multiple machine-readable storage mediums and the controller 202 may be distributed across multiple processing resources. Put another way, the instructions executed by the controller 202 may be stored across multiple machine-readable storage mediums and executed across multiple processing resources, such as in a distributed or virtual computing environment.

As illustrated in FIG. 2, the controller 202 may comprise a processing resource 210, and a memory resource 212 storing machine-readable instructions to cause the processing resource 210 to perform a number of operations relating to router advertisement caching. That is, using the processing resource 210 and the memory resource 212, the controller 202 may cache router advertisements, such as caching router advertisements from routers illustrated in FIG. 1, among other operations. Processing resource 210 may be a central processing unit (CPU), microprocessor, and/or other hardware device suitable for retrieval and execution of instructions stored in memory resource 212.

The controller 202 may include instructions 214 stored in the memory resource 212 and executable by the processing resource 210 to cache a RA. For example, controller 202 may include instructions 214 stored in the memory resource 212 and executable by the processing resource 210 to cache a RA from a router.

The controller 202 may include instructions 216 stored in the memory resource 212 and executable by the processing resource 210 to select the cached RA from the router. As described in relation to FIG. 1, selecting the cached RA from the router may be in response to a client device associating with the controller 202. The controller 202 may include instructions 218 to unicast the RA from the router to a client device.

In this manner, the controller 202 may cache RAs from routers, select the cached RA from the router in response to a client device associating with the controller 202, and unicast the RA from the router to the client device, allowing for load balancing of client devices across routers associated with controller 202.

Figure 3:
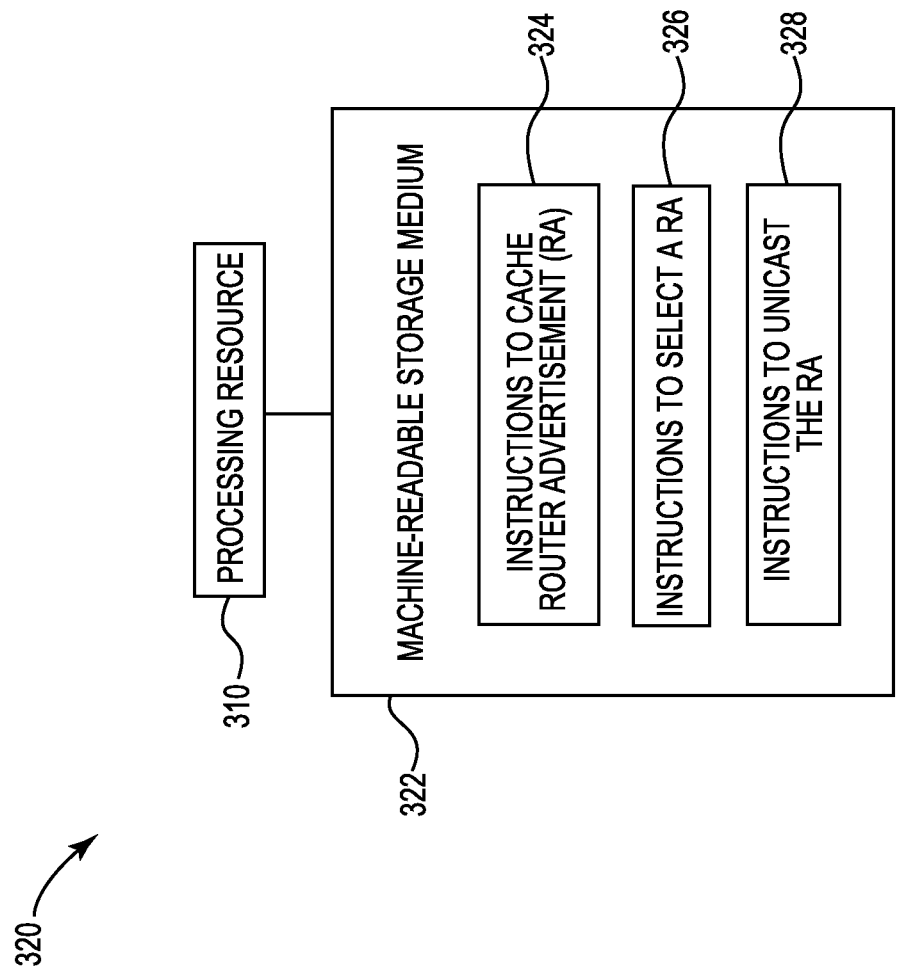
FIG. 3 is a block diagram of an example system, consistent with the present disclosure.

FIG. 3 is a block diagram of an example system 320, consistent with the present disclosure. In the example of FIG. 3, system 320 includes a processing resource 310 and a machine-readable storage medium 322. Although the following descriptions refer to a single processing resource and a single machine-readable storage medium, the descriptions may also apply to a system with multiple processing resources and multiple machine-readable storage mediums. In such examples, the instructions may be distributed across multiple machine-readable storage mediums and the instructions may be distributed across multiple processing resources. Put another way, the instructions may be stored across multiple machine-readable storage mediums and executed across multiple processing resources, such as in a distributed computing environment.

Processing resource 310 may be a central processing unit (CPU), microprocessor, and/or other hardware device suitable for retrieval and execution of instructions stored in machine-readable storage medium 322. In the particular example shown in FIG. 3, processing resource 310 may receive, determine, and send instructions 324, 326, and 328. As an alternative or in addition to retrieving and executing instructions, processing resource 310 may include an electronic circuit comprising a number of electronic components for performing the operations of the instructions in machine-readable storage medium 322. With respect to the executable instruction representations or boxes described and shown herein, it should be understood that part or all of the executable instructions and/or electronic circuits included within one box may be included in a different box shown in the figures or in a different box not shown.

Machine-readable storage medium 322 may be any electronic, magnetic, optical, or other physical storage device that stores executable instructions. Thus, machine-readable storage medium 322 may be, for example, Random Access Memory (RAM), an Electrically-Erasable Programmable Read-Only Memory (EEPROM), a storage drive, an optical disc, and the like. The executable instructions may be "installed" on the system 320 illustrated in FIG. 3. Machine-readable storage medium 322 may be a portable, external or remote storage medium, for example, that allows the system 320 to download the instructions from the portable/external/remote storage medium. In this situation, the executable instructions may be part of an "installation package". As described herein, machine-readable storage medium 322 may be encoded with executable instructions to perform router advertisement caching.

Instructions to cache router advertisement 324, when executed by processing resource 310, may cause system 320 to cache a RA received from a first router of a plurality of routers and cache a RA received from a second router of the plurality of routers.

Instructions to select a RA 326, when executed by processing resource 310, may cause system 320 to select the RA received from the first router in response to a client device associating with the controller. As described in connection with FIG. 1, the RA may be selected by a round-robin selection, selected based on router information, and/or selected based on client device information.

Instructions to unicast the RA 328, when executed by processing resource 310, may cause system 320 to unicast the selected RA from the first router to the client device to cause the client device to connect to the first router. Causing the client device to connect to the first router may include causing the client device to populate a routing table of the client device with gateway information for the first router.

Figure 4:
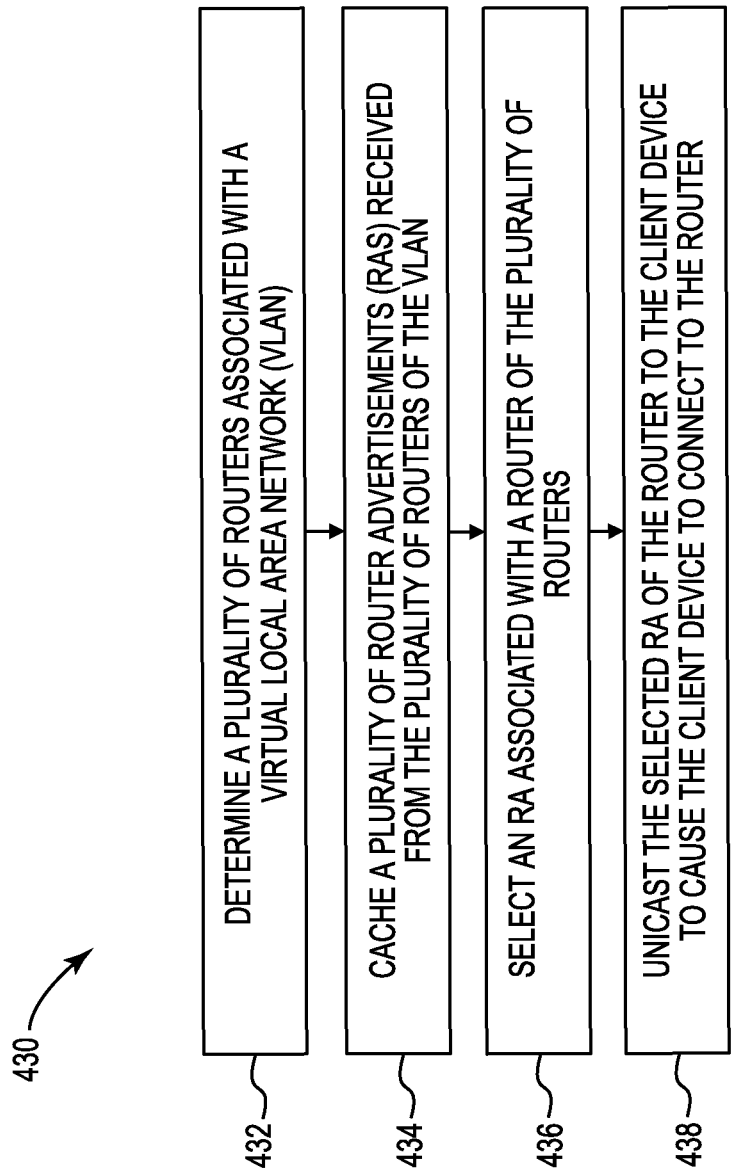
FIG. 4 illustrates an example method, consistent with the present disclosure.

FIG. 4 illustrates an example method 430 consistent with the present disclosure. At 432, the method 430 may include determining a plurality of routers associated with a VLAN. For example, a controller may utilize a router discovery mechanism associated with an IPv6 network environment to determine the plurality of routers associated with a VLAN of the controller.

At 434, the method 430 may include caching a plurality of RAs received from the plurality of routers of the VLAN. For instance, the controller may cache RAs received from routers associated with the VLAN.

The controller may perform periodic health checks on the plurality of routers. For example, the controller may send periodic router solicitations to the plurality of routers at a predetermined frequency. The plurality of routers may send RAs to the controller in response to the router solicitations. In the event a router fails a health check, the controller can remove the cached RA that was received from the failed router. Failing a router health check may include a router failing to send an RA to the controller within a threshold amount of time.

At 436, the method 430 may include selecting an RA associated with a router of the plurality of routers. The controller can select an RA in response to a client device associating with the controller. As described in connection with FIGS. 1 and 3, selection of the RA can be based on a round-robin selection, selected based on router information, and/or selected based on client device information.

At 438, the method 430 may include unicasting the selected RA of the router to the client device to cause the client device to connect to the router. That is, the controller can unicast the RA to the client device. The client device, in response to receiving the RA from the controller, can populate a routing table of the client device with gateway information for the router so that the client device can communicate on the network through the router.

Causing the client device to connect to the router can include causing the client device to generate an IP address. The client device can generate an IP address based on prefix information included in the RA received from the controller.

In the event of a failed health check, the controller can remove the cached RA that was received from the failed router. The controller can cause a client device associated with the failed RA to disconnect from the failed router by the controller sending a zero lifetime RA to the client device. The controller can then select a cached RA from a router that is functioning, and unicast that RA to the client device to cause the client device to connect to the functioning router.

A different RA received from a different router can be selected based on a different client device associating with the controller. The controller can unicast the different RA to the different client device so that the different client device can populate a routing table of the different client device with gateway information for the different router so that the different client device can communicate on the network through the different router.

Using method 430, RAs from routers associated with a VLAN can be cached by a controller, and unicast to client devices as they associate with the controller. Method 430 can allow for load balancing of client devices across routers associated with the VLAN, as well as provide for a failover mechanism in the event a router of the VLAN fails.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure, and should not be taken in a limiting sense. As used herein, the designator "M" and "N", particularly with respect to reference numerals in the drawings, indicates that a plurality of the particular feature so designated can be included with examples of the present disclosure. The designators can represent the same or different numbers of the particular features. Further, as used herein, "a plurality of" an element and/or feature can refer to more than one of such elements and/or features.

I claim:

1. A controller, comprising:
a processing resource; and
a memory resource storing machine-readable instructions to cause the processing resource to:
cache a router advertisement (RA) from a router of a plurality of routers associated with a virtual local area network (VLAN) of the controller;
select, in response to a client device associating with the controller, the cached RA from the router;
unicast the RA from the router to the client device;
send router solicitations to the plurality of routers of the VLAN of the controller;
unicast, to the client device, a zero lifetime RA in response to the router of the plurality of routers failing to respond to the router solicitation in a predetermined threshold time to cause the client device to disconnect from the router; and
unicast, to the client device associated with the router of the plurality of routers, a different RA associated with a different router of the plurality of routers to cause the client device to connect to the different router.

2. The controller of claim 1, wherein the RA is unicast to the client device to cause the client device to connect to the router.

3. The controller of claim 1, wherein the RA from the router is selected in response to receiving a router solicitation from the client device.

4. The controller of claim 1, wherein the controller is included in a switch.

5. The controller of claim 1, wherein the controller is included in an access point (AP).

6. A non-transitory machine-readable medium storing instructions executable by a processing resource to:
cache, by a controller, a router advertisement (RA) received from a first router of a plurality of routers and an RA received from a second router of the plurality of routers;
select, in response to a client device associating with the controller, the RA received from the first router;
unicast the selected RA from the first router to the client device to cause the client device to connect to the first router;
send, by the controller, router solicitations to the plurality of routers of the VLAN of the controller;
unicast, to the client device associated with the router of the plurality of routers, a zero lifetime RA in response to the router of the plurality of routers failing to respond to the router solicitation in a predetermined threshold time to cause the client device to disconnect from the router; and
unicast, to the client device associated with the router of the plurality of routers, a different RA associated with a different router of the plurality of routers to cause the client device to connect to the different router.

7. The medium of claim 6, comprising instructions to:
select, in response to a different client device associating with the controller, the RA received from the second router; and
unicast the RA from the second router to the different client device to cause the different client device to connect to the second router.

8. The medium of claim 6, wherein an RA received from the first or the second router is selected by round-robin selection.

9. The medium of claim 6, wherein an RA received from the first or the second router is selected based on router information, including at least one of:
a plurality of client devices associated with each router of the plurality of routers;
response times of each router of the plurality of routers;
a priority of each router of the plurality of routers;
bandwidth of each router of the plurality of routers; and
data throughput of each router of the plurality of routers.

10. The medium of claim 6, wherein an RA received from the first or the second router is selected based on client device information, including at least one of:
client device type;
a role associated with the client device;
time of day;
client association history; and
client activity history.

11. The medium of claim 6, wherein:
the first router and the second router are associated with a virtual local area network (VLAN); and
the VLAN operates on an Internet Protocol version 6 (IPv6) protocol.

12. A method, comprising:
determining, by a controller, a plurality of routers associated with a virtual local area network (VLAN) of the controller;
caching, by the controller, a plurality of router advertisements (RAs) received from the plurality of routers of the VLAN;
selecting, by the controller in response to a client device associating with the controller, an RA associated with a router of the plurality of routers;
unicasting the selected RA of the router to the client device to cause the client device to connect to the router;
sending, by the controller, router solicitations to the plurality of routers of the VLAN of the controller;
unicasting, to the client device associated with the router of the plurality of routers, a zero lifetime RA in response to the router of the plurality of routers failing to respond to the router solicitation in a predetermined threshold time to cause the client device to disconnect from the router; and
unicasting, to the client device associated with the router of the plurality of routers, a different RA associated with a different router of the plurality of routers to cause the client device to connect to the different router.

13. The method of claim 12, wherein causing the client device to connect to the router includes causing the client device to:
generate an Internet Protocol (IP) address based on prefix information included in the RA associated with the router; and
populate a gateway included in a routing table of the client device.

14. The controller of claim 1, further comprising the memory resource storing the machine-readable instructions to cause the processing resource to cache an RA received from the different router of the plurality of routers.

15. The controller of claim 14, wherein an RA received from the router or different router is selected based on client device information, including at least one of:
client device type;
a role associated with the client device; and
time of day.

16. The controller of claim 14, further comprising the memory resource storing the machine-readable instructions to:
select, in response to a different client device associating with the controller, the RA received from the different router; and
unicast the RA from the different router to the different client device to cause the different client device to connect to the different router.

17. The method of claim 12, wherein the plurality of router advertisements (RAs) cached by the controller includes an RA received from the different router of the plurality of routers.

18. The method of claim 17, wherein an RA received from the router or different router is selected based on client device information, including at least one of:
client device type; and
a role associated with the client device.

19. The method of claim 17, further comprising:
selecting, in response to a different client device associating with the controller, the RA received from the different router; and unicasting the RA from the different router to the different client device to cause the different client device to connect to the different router.

20. The method of claim 12, further comprising sending the router solicitations to the plurality of routers of the VLAN of the controller at a predetermined frequency.

* * * * *